3,218,256
LUBRICATING COMPOSITIONS
Eric Descamp Edwards and John Scotchford Elliott, London, England, assignors to Castrol Limited, London, England, a company of Great Britain
No Drawing. Filed Sept. 11, 1962, Ser. No. 222,969
Claims priority, application Great Britain, Jan. 14, 1959, 1,424/59; Oct. 8, 1959, 34,183/59
20 Claims. (Cl. 252—47.5)

This application is a continuation-in-part of our now abandoned application Serial No. 1,417 filed on the 11th of January 1960.

This invention relates to lubricating compositions and is particularly concerned with synthetic lubricants based upon organic carboxylic esters.

It is an object of the present invention to provide lubricating compositions suitable for use in internal combustion engines or other mechanisms where high temperatures are involved.

One application where synthetic lubricants are required to operate at high temperatures is in the lubrication of aircraft gas turbine engines. In this application although many compounds have been suggested as antioxidants, we believe that phenothiazine is the only material which has been extensively used.

Phenothiazine is a very good antioxidant in diester-based synthetic lubricants; however, it suffers from the drawback that, when the oil is subjected to high temperatures and oxidising conditions, the phenothiazine is sacrificially oxidised with the formation of an insoluble oxidation product which accumulates as a sludge. This sludge tends to accumulate in the various parts, particularly in the bearings, resulting in bearing failure.

Jet engine manufacturers, as the result of engine and, sometimes also, bearing rig tests, will give a particular oil clearance for use in a particular engine up to a certain maximum bearing temperature. "Phenothiazine dirtiness" is often the limiting factor, and, if this could be substantially reduced or eliminated, much higher bearing temperatures could be attained.

We have now found that by using certain derivatives of phenothiazine instead of phenothiazine, this sludge can be largely eliminated and higher bearing temperatures can, in fact, be attained.

Thus, for example, in a high-speed bearing rig test a synthetic oil containing 1% of phenothiazine as antioxidant resulted in bearing failure at 250° C. (repeat test 240° C.) whereas when the phenothiazine was replaced by 2.5% of 3,7 dioctyl phenothiazine failure occurred at 280° C. (repeat test 270° C.).

This advantage of such phenothiazine derivatives has not been hitherto appreciated.

However, although high bearing temperatures can be attained by the use of these derivatives of phenothiazine in the lubricating compositions, the general oxidation resistance, as indicated particularly by acidity rise and the development of corrosive properties, is less satisfactory than when phenothiazine is used even when larger proportions of these derivatives are used so as to introduce the same amount of nitrogen and sulphur (present in the phenothiazine nucleus) into the compositions. We have now found, however, that by using with the phenothiazine derivative certain amines an improvement is obtained in oxidation stability, while retaining the advantage of the non-sludging properties.

According to the present invention, there is provided a lubricating composition consisting essentially of a synthetic organic lubricating oil, which oil consists essentially of a neutral saturated organic carboxylic acid ester base, said lubricating oil having dissolved therein three additives (a), (b), and (c).

Additive (a) being present in an amount to provide a sulphur content of from 0.03 or 0.05 to 0.20 percent by weight on the total weight of the composition and being a phenothiazine derivative having the formula:

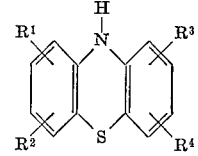

wherein the benzene rings of the derivative may contain at least one additional benzene ring fused thereto and wherein $R^1$, $R^2$, $R^3$ and $R^4$ are selected from the group consisting of hydrogen, alkyl radicals and alkoxy radicals ($C_nH_{2n+1}O$), the derivative having a total number of carbon atoms in radicals $R^1$, $R^2$, $R^3$ and $R^4$ of from 8 to 20, Additive (b) being present in an amount to provide a nitrogen content of from 0.015 to 0.10 percent by weight on the total weight of the composition and being a secondary aromatic amine, containing two aromatic groups directly attached to nitrogen, selected from the group consisting of diphenylamines and N-phenylnaphthylamines, and Additive (c) being present in an amount of from 0.01 to 0.3 percent by weight on the weight of the composition and being benzotriazole.

Preferably the synthetic lubricating oil has a viscosity index of at least 100, a pour point not exceeding —40° F., a boiling point of not less than 600° F. and a flash point not less than 350° F.

The substituent alkyl group or groups of the additive (a) may be of a variety of chain lengths and can be varied so that the total number of carbon atoms is from 8 to 16 or higher, e.g. 20. The substituent alkyl groups should not in general be too large or an unduly large amount of the additive would have to be used, though in any particular composition they are desirably sufficiently large to obviate sludging. When additive (a) has an additional benzene ring fused to the phenothiazine nucleus, it is generally desirable to employ a phenothiazine compound having a total of at least 12 carbon atoms in the alkyl or alkoxy substituent group or groups to obviate sludging.

Additive (a) may be a dialkyl phenothiazine having from 8 to 20 carbon atoms in the alkyl groups, and is preferably 3,7 dioctyl phenothiazine. Additive (a) may be also a monoalkoxy phenothiazine having from 8 to 20 carbon atoms in the alkoxy group. Examples of compounds which may be employed are:

3-mono-octyl phenothiazine
3,7 dibutyl phenothiazine
6,7 dioctyl phenothiazine
3-n-octoxyphenothiazine
3-n-hexadecoxyphenothiazine
3-n-dodecoxyphenothiazine
3-n-decoxyphenothiazine
2-n-hexadecoxyphenothiazine
3-n-octoxy-7 octylphenothiazine
3,7 dioctoxy phenothiazine
2 hexadecoxy-3 octyl phenothiazine
3 octadecoxy 6,7 benzophenothiazine Additive (b) may be a diphenylamine or a N-phenylnaphthylamine, and may be alkyl substituted in at least one aromatic nucleus by one or more alkyl groups which may contain a total of up to 20 carbon atoms. Preferred examples of additive (b) are diphenylamine, pp'dioctyldiphenylamine, phenyl-α-naphthylamine and phenyl - β-naphthylamine. Other examples of additive (b) are:

pp'-dibutyl diphenylamine
N-phenyl-p-octyl aniline
Monooctyl phenyl-α-naphthylamine
β,β-Dinaphthylamine Additive (c), benzotriazole, is included in the composition in addition to additives (a) and (b) in an amount of from 0.01 to 0.3, and preferably from 0.05 to 0.20 percent by weight. This additive not only affords protection of copper, cuprous metals and silver against corrosive attack but also improves the overall oxidation resistance of the composition in the presence of these metals.

The esters which are particularly suitable for use as a lubricant base in accordance with the present invention, when the composition is to be employed for the lubrication of aircraft gas turbine engines, are substantially neutral saturated organic carboxylic acid esters having a viscosity index of at least 100, a pour point not exceeding —40° F., a boiling or decomposition temperature not less than 600° F. and a flash point not less than 350° F. It will be understood that mixtures of esters may be employed comprising individual esters which have freezing points above —40° F. and viscosity indices below 100, provided that the mixture itself has the desired properties.

The liquid esters may be of the type having the general formula

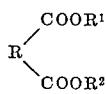

wherein R is a saturated aliphatic or alicyclic hydrocarbon radical having from 2 to 8 carbon atoms, and $R^1$ and $R^2$ are the same or different and are branched-chain alkyl or alkyl-substituted alicyclic radicals having from 6 to 9 carbon atoms and may, if desired, contain ether oxygen linkages. Examples of the radical R are $(CH_2)_N$ (where $n$ is an integer from 2 to 8 and is preferably 7 or 8) and

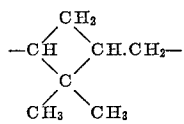

The synthetic organic lubricating oil may contain up to 70 percent, e.g., from 1 to 70 percent, by weight of complex esters obtained by esterifying the dicarboxylic acids with a mixture of an alcohol and a glycol to give complex esters having the general formula

wherein R, $R^1$ and $R^2$ are as defined above and $R^3$ is derived from a glycol or polyglycol having not more than 12 carbon atoms and may, if desired, contain ether oxygen linkages.

Other complex esters which may be employed are prepared by esterifying a dicarboxylic acid (1 mol) with a glycol (2 mols) and a monocarboxylic acid (2 mols) or with 1 mol each of a glycol, a monocarboxylic acid and a monohydric alcohol or with 2 mols each of a mono hydroxy monocarboxylic acid and a monohydric alcohol. Still other complex esters may be prepared by esterifying a glycol (1 mol) with a mono hydroxy monocarboxylic acid (2 mols) and a monocarboxylic acid (2 mols).

Other esters which may be suitable in certain circumstances are prepared by esterifying a glycol or polyglycol (1 mol) with 2 mols of a monocarboxylic acid.

The mono-, di- and polyhydric alcohols, and the monocarboxylic acids employed in the preparation of the complex esters may also contain ether oxygen linkages. The esters should, however, be free from elements other than carbon, hydrogen and oxygen.

Although in certain instances it may be possible to employ one or more of the foregoing complex esters as the synthetic lubricant base, they are generally employed blended with one or more simple esters, particularly the diesters of the type already described.

The liquid esters are preferably diesters derived from glutaric, adipic, pimelic, suberic, azelaic, sebacic and pinic acids.

It will be understood that different esters may be selected according to the conditions under which the lubricant is to be used. Thus for use at very high temperatures it will be preferred to employ hindered esters or esters of high molecular weight (containing at least 17 carbon atoms) and particularly the higher di-esters of azelaic and sebacic acid, derived from branched-chain alcohols having at least 6 carbon atoms.

Preferred diesters are di(2-ethyl hexyl) azelate, di(2-ethyl hexyl) sebacate, di-isooctyl sebacate, 2-ethyl hexyl 3:5:5 trimethyl hexyl sebacate and di-iso octyl azelate. Other examples of diesters are:

Di (3:5:5 trimethyl hexyl) sebacate
Di (1-methyl-4-ethyl octyl) sebacate
Di-isodecyl azelate
Di-isotridecyl azelate Other esters which may be employed are:

Di (1-methyl-4-ethyl octyl) glutarate
Di (2-ethyl hexyl) adipate
Di (3-methyl butyl) azelate
Di (3:5:5-trimethyl hexyl) azelate
Di (2-ethyl hexyl) pinate
Di ($C_{10}$ Oxo) adipate
Bis (diethylene glycol monobutyl ether) adipate
Di (isooctyl/isodecyl) adipate
Di-isotridecyl adipate Whereas the majority of esters falling within the foregoing class possess both a high viscosity index and low pour-point, certain of them e.g. di(1:3 dimethyl butyl) adipate, di(3-methyl butyl) sebacate have relatively high freezing points (above 0° F.), and therefore would not normally be suitable for the purpose of this invention, except in admixture with other esters of lower freezing point.

The complex esters which may be employed are preferably prepared by esterifying 2 mols. of the dicarboxylic acid, 2 mols. of the branched-chain aliphatic or alkyl-substituted alicyclic alcohol, and not more than 1 mol. of glycol. Examples of glycols which may be used are ethylene, propylene and hexylene glycols, 2-ethyl-1:3 hexanediol and the polyglycols, e.g. diethylene, triethylene, and tetraethylene glycol.

When a monocarboxylic acid is used in preparing a complex ester this should be a straight or branched-chain aliphatic acid having from 2 to 10 carbon atoms inclusive.

Specific examples of suitable complex esters which may be employed in accordance with the present invention are:

Ester prepared from methylene glycol (1 mol), adipic acid (2 mols) and 2-ethyl hexanol (2 mols).

Ester prepared from tetraethylene glycol (1 mol), sebacic acid (2 mols), and 2-ethyl hexanol (2 mols).

Ester prepared from 2-ethyl-1:3 hexanediol (1 mol), sebacic acid (2 mols), and 2-ethyl hexanol (2 mols).

Ester prepared from diethylene glycol (1 mol), adipic acid (2 mols) and n-butanol (2 mols).

Ester prepared from polyglycol 200 (1 mol), sebacic acid (2 mols) and ethylene glycol mono (2-ethyl butyl) ether (2 mols).

Ester prepared from sebacic acid (1 mol), tetraethylene glycol (2 mols) and caproic acid (2 mols).

Ester prepared from triethylene glycol (1 mol) adipic acid (1 mol), n-caproic acid (1 mol) and 2-ethyl hexanol (1 mol).

Ester prepared from sebacic acid (1 mol), lactic acid (2 mols) and n-butanol (2 mols).

Ester prepared from tetraethylene glycol (1 mol), lactic acid (2 mols) and butyric acid (2 mols).

Examples of suitable glycol and polyhydric alcohol esters of monocarboxylic acids which may be employed are:

Triethylene glycol di(2-ethyl hexanoate)
Hexanediol 1,6 di(2-ethyl hexanoate)
Dipropylene glycol dipelargonate Also mixtures of esters made from a saturated aliphatic dibasic acid and a technical mixture of alcohols such as a mixture of alcohols obtained by the Oxo process may be used as the synthetic oil or as a constituent of a blend of synthetic oils.

Esters which will withstand higher temperatures than the foregoing diesters are esters of "hindered" polyhydric alcohols, which possess the neopentyl structure. Examples of esters of this type are:

(A) Esters of trimethylolpropane (1 mol) with monocarboxylic acids (3 mols). e.g.; trimethylol propane tri-n-octanoate.)
(B) Esters of pentaerythritol (1 mol) with monocarboxylic acids (4 mols)
(C) Esters of di- or tripentaerythritol (1 mol) with monocarboxylic acids (6 or 8 mols)
(D) Complex esters prepared from neopentyl glycol (2 mols) dicarboxylic acids (1 mol) and monocarboxylic acids (2 mols)
(E) Complex esters prepared from neopentyl glycol (1 mol) dicarboxylic acids (2 mols) and monohydric neo-alcohols, e.g. 224 trimethyl pentanol (2 mols)

Examples of the dicarboxylic acids which may be used are adipic, azelaic and sebacic acids and of the monocarboxylic acids caproic, caprylic, n-heptanoic and pelargonic acids. The acids have to be chosen so that the resulting ester possesses the requisite physical properties, e.g. viscosity, pour point, and often mixtures of acids must be selected to provide a synthetic oil which will be suitable for the most exacting military specifications. Alternatively, blends of several different hindered esters can be used. It is sometimes desirable to employ blends of one or more hindered esters with one or more diesters.

The proportion of the two additives ($a$) and ($b$) to be incorporated in the lubricating composition may be varied depending on the degree of oxidation protection required.

The term "neutral" as applied to the esters throughout the specification is to be understood as referring to esters having an acidity not exceeding about 0.3 mg. KOH per gram.

The compositions according to the present invention include synthetic lubricating oils based upon synthetic carboxylic esters having incorporated therein, as thickening agents, from 1 to 50 percent by weight on the weight of the composition of a substantially water-insoluble polyoxyalkylene glycol ether or mixture of such ethers, having a viscosity of from 10 to 70 centistokes at 210° F.

These polyoxyalkylene glycol ethers have the general formula $R—O(R_1O)_n—R^2$, where R represents an alkyl group, $R^1$ an alkylene radical, $R^2$ is H or another alkyl group, and n is an integer. Preferably $R^1$ represents a propylene radical, or a mixture of propylene and ethylene radicals, suitable products being obtained by reacting propylene oxide or a mixture of propylene and ethylene oxides with an aliphatic monohydric alcohol or with a mono-ether of a glycol. The polyoxyalkylene chain may be composed, therefore, of alkylene radicals $R^1$ of more than one kind. In the preferred ethers, where $R^2$ is hydrogen, it will generally be necessary to have at least a proportion of propylene groups present in the polyoxyalkylene chain in order to obtain substantially water-soluble products.

Particularly preferred are the so-called "LB series" of synthetic lubricants sold under the registered trademark "Ucon", these, it is understood consisting of mixed polyoxypropylene glycol ethers containing one free hydroxyl group per molecule.

Specific examples of suitable "Ucons" are LB–285, LB–385, LB–525, LB–625, LB–1145 and LB–1715, the viscosities of these materials at 210° F. ranging from 11.0 to 55.3 centistokes. The two highest members of the series are especially suitable for use in selected compositions within the scope of this invention designed to comply with the British specification D. Eng. R.D. 2487. Alternatively, "Ucon" fluids of the so-called "D" series may be employed, e.g. "Ucon" DLB 220–E, these materials being diethers in which both R and $R^2$ are alkyl groups.

In addition to the essential components of the lubricants of the present invention there may be present additional additives such as rust inhibitors e.g. metal petroleum sulphonates and load-carrying additives such as organic phosphate or phosphite esters. A small proportion e.g. 0.01 to 0.1% of sebacic, azelaic or adipic acid may also be included if desired as an inhibitor of lead corrosion.

It has been found that particularly good load-carrying properties may be conferred on the lubricating compositions of the present invention by the inclusion of a chlorinated di- or polyphenyl or mixture of such compounds which may be defined as diphenyls, terphenyls, higher polyphenyls or mixtures of such compounds containing at least two chlorine atoms for each benzene nucleus present, said chlorine atoms being attached directly to carbon atoms of the aromatic nuclei. These compounds should contain no elements other than carbon, hydrogen and chlorine and no nuclear substituents other than alkyl groups, substantially all the chlorine present being directly attached to the aromatic nuclei.

A range of suitable compounds of this type are available commercially, being sold under the registered trademark "Aroclor." Those materials containing at least about 48 percent of chlorine are suitable for use in the compositions of the present invention, but suitable products are available containing up to 70 percent of chlorine.

It will, of course, be appreciated that additives for use in gas turbine engines must possess a high degree of thermal stability, low volatility and high flesh point and must not be corrosive towards metals at high temperatures. The great majority of organic chlorine-containing compounds would be quite unsuitable for use in such lubricants for one or other of the foregoing reasons and the same would be true of conventional sulphur-containing extreme pressure additives. These load-carrying additives possess remarkable thermal stability and very low volatility and they do not increase the tendency of the lubricants to oxidise or corrode metals at high temperatures. Furthermore, considering the relatively inactive character of the chlorine attached to the aromatic nuclei, they are surprisingly effective in increasing the load-carrying capacity of the compositions.

The chlorinated di- or poly- phenyls are employed in concentrations ranging from 0.5 to 10.0% by weight, and preferably from 1.0 to 5.0% by weight on the weight of the final composition.

In some cases it may be desirable to employ alone or in conjunction with the chlorinated di- or poly- phenyls one or more neutral organic phosphate or phosphite esters, e.g. tri-m-tolyl phosphate or tri(o-chlorophenyl) phosphate.

A preferred composition in accordance with the invention is a lubricating composition consisting essentially of a diester which has the general formula

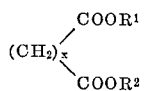

where $R^1$ and $R^2$ are the same or different and are branched-chain alkyl radicals having at least six carbon atoms, and $x$ is 7 or 8 having dissolved therein from 1 to 2 percent by weight of 3,7 dioctylphenothiazine, from 1 to 2 percent by weight of pp'dioctyldiphenylamine, from 0.8 to 3 percent by weight of a chlorinated diphenyl containing from 48 to 70 percent by weight of chlorine, and from 0.05 to 0.2 percent by weight of benzotriazole. The diester may be di(2-ethyl hexyl) sebacate or diisooctyl azelate. A part of the diester may be replaced by from 25 to 30 percent by weight of a polyoxypropylene glycol ether having a viscosity of from 35 to 40 centistokes at 210° F.

Following is a description, by way of example, of compositions in accordance with the invention. The experimental data includes certain tests which are by way of comparison only. Percentages are percentages by weight on the final weight of the composition.

EXAMPLE I

| | Percent |
|---|---|
| Di(2-ethyl hexyl) sebacate | 66.4 |
| Ucon LB–1145 | 29.5 |
| 3,7 dioctyl phenothiazine | 2.0 |
| pp' Dioctyl diphenylamine | 2.0 |
| Benzotriazole | 0.1 |

EXAMPLE II

| | Percent |
|---|---|
| Di-(2-ethyl hexyl) sebacate | 66.65 |
| Ucon LB–1145 | 28.0 |
| Aroclor 4465 | 2.0 |
| 3,7 dioctyl phenothiazine | 1.5 |
| pp' dioctyl diphenothiazine | 1.5 |
| "C.P.S." concentrate | 0.25 |
| Benzotriazole | 0.1 |

"C.P.S." concentrate was a mineral oil solution containing approximately 20% of calcium petroleum sulphonate.

The compositions of Example I and Example II are designed to comply with British M.O.S. Specification DERD 2487.

EXAMPLE III

| | Percent |
|---|---|
| Diisooctyl azelate | 46.8 |
| Dipropylene glycol dipelargonate | 46.8 |
| Aroclor 4465 | 3 |
| 3,7 dioctyl phenothiazine | 2 |
| pp' dioctyl diphenylamine | 1 |
| "C.P.S." concentrate | 0.25 |
| Benzotriazole | 0.1 |
| Sebacic acid | 0.05 |

This composition is designed to comply with U.S. Specification MIL–L–7808C.

EXAMPLE IV

| | Percent |
|---|---|
| Di(2-ethyl hexyl) sebacate | 67.2 |
| Ucon LB 1145 | 28.0 |
| Aroclor 1254 | 2.4 |
| 3,7 dioctyl phenothiazine | 1.5 |
| Phenyl-α-naphthylamine | 0.5 |
| "C.P.S." concentrate | 0.25 |
| Benzotriazole | 0.15 |

"C.P.S." concentrate was a mineral oil solution containing approximately 20% of calcium petroleum sulphonate.

EXAMPLE V

| | Percent |
|---|---|
| Complex ester prepared from 2-ethyl hexanol (2 mols), sebacic acid (2 mols) and tetraethylene glycol (1 mol) | 59.9 |
| Di (2-ethyl hexyl) sebacate | 37.5 |
| 3,7 dioctyl phenothiazine | 1.5 |
| pp' dioctyl diphenylamine | 1.0 |
| Benzotriazole | 0.1 |

EXAMPLE VI

| | Percent |
|---|---|
| Di (2-ethyl hexyl) azelate | 48.1 |
| Complex ester prepared from 2-ethyl hexanol (2 mols), sebacic acid (2 mols) and 2-ethyl-1:3 hexanediol (1 mol) | 50.0 |
| Dibutyl phenothiazine | 1.0 |
| Monooctylphenyl-α-naphthylamine | 0.75 |
| Benzotriazole | 0.15 |

EXAMPLE VII

| | Percent |
|---|---|
| Trimethylolpropane mixed esters of straight chain aliphatic carboxylic acids (about 75% $C_9$, 25% $C_6$, $C_7$ and $C_8$ acids) | 61.0 |
| Diiso-octyl azelate | 18.0 |
| Ucon LB 1715 | 16.45 |
| 3,7 dioctyl phenothiazine | 1.1 |
| pp' dioctyl diphenylamine | 1.1 |
| Aroclor 5460 | 2.0 |
| "C.P.S." concentrate | 0.25 |
| Benzotriazole | 0.1 |

EXAMPLE VIII

| | Percent |
|---|---|
| Trimethylolpropane tripelargonate | 96.9 |
| 3-n-octoxy phenothiazine | 2.0 |
| Phenyl-α-naphthylamine | 1.0 |
| Benzothiazole | 0.1 |

EXAMPLE IX

| | Percent |
|---|---|
| Diiso-octyl azelate | 45.0 |
| Trimethylolpropane tri-n-heptanoate | 15.0 |
| 2,2,4 trimethyl pentyl azelate | 34.7 |
| 3,7 dioctyl phenothiazine | 1.1 |
| pp' dioctyl diphenylamine | 1.1 |
| Tri-m-cresyl phosphate | 3.0 |
| Benzotriazole | 0.1 |

Additional compositions in accordance with the invention are set forth in the following tables.

The test procedure used for the tests in Tables I to V, VII and X was the oxidation/corrosion test described in MIL-L7808C specification, paragraph 4.5.5. which involves blowing air through the oil at 347° F. (175° C.) for 72 hours in the presence of metal specimens consisting of aluminum alloy, magnesium alloy, steel and copper tied together to form a square with a silver specimen inserted as a diagonal between the copper and steel, and the aluminum and magnesium junctions.

This was a very severe test, results being affected both by the nature of the base fluid and by the amount and nature of the antioxidant present. A satisfactory result in this test indicated that the oil was possessed of very good oxidation stability.

In the "Air-blowing oxidation test" air was bubbled at a rate of 15 litres per hour through 50 ml. of the oil contained in a boiling tube approximately 25 mm. in internal diameter and heated in an oil bath for 192 hours at 150° C. The volatility loss (percent loss in weight of sample) was recorded, also the percentage increase in viscosity at 210° F. (cs.), acidity increase and benzene insolubles (mgs. insoluble matter per gram of oil), all corrected for volatility loss, i.e. calculated on the basis of the oil being restored to its original quantity by topping up with fresh oil.

In the "Confined heat stability test," the oils were heated in cylindrical stainless steel vessels 6 cm. in diameter and 7 cm. tall with close fitting lids having a 1.6 mm. diameter hole in the centre. The vessels were heated in an oven for 192 hours at 250° C., the oxidised oils being assessed in the same manner as in the "Air-blowing oxidation test."

*Key to abbreviations used in tables*

ESTERS

DOAZ _____ Di-isooctyl azelate.
DNS _____ Di (3:5:5 trimethyl hexyl) sebacate.
DODA _____ Di (iso-octyl/isodecyl) adipate.

ADDITIVES (a)

DOPT _____ 3,7 dioctyl phenothiazine.
HDPT _____ 3-n-hexadecoxy phenothiazine.
DBPT _____ 3,7 dibutyl phenothiazine.

ADDITIVES (b)

PAN _____ Phenyl-α-naphthylamine.
DODP _____ pp′-dioctyl diphenylamine.
PBN _____ Phenyl-β-naphthylamine.
DP _____ Diphenylamine.
OPAN _____ Mono-octyl phenyl-α-naphthylamine.

TABLE I.—OXIDATION/CORROSION TESTS AT 347° F. (72 HOURS). DI(2-ETHYL HEXYL) SEBACATE USED THROUGHOUT AS BASE FLUID

| Test No. | Additives present | | Weight change of metal specimens, mgs./sq. cm. | | | | | Percent change in viscosity, cs. at 100° F. | Total acid number increase, mg. KOH/gm. | Percent insoluble in pet. ether |
|---|---|---|---|---|---|---|---|---|---|---|
| | (a) | (b) | Aluminium alloy | Magnesium alloy | Copper | Steel | Silver | | | |
| 1 | Phenothiazine (0.5%) | None | +0.10 | +0.09 | −0.40 | +0.08 | +0.17 | +3.1 | 1.93 | 0.50 |
| 2 | DOPT (1.0%) | do | +0.02 | −0.70 | −2.1 | +0.06 | +0.04 | +14.3 | 16.0 | 0.50 |
| 3 | DOPT (2.0%) | do | +0.01 | +0.03 | −1.2 | +0.01 | −0.02 | +6.7 | 11.1 | 0.20 |
| 4 | DOPT (3.0%) | do | Nil | Nil | −1.6 | +0.01 | +0.06 | +5.2 | 2.9 | Negligible |
| 5 | None | DODT (1.0%) | −0.02 | −1.0 | −13.0 | −0.01 | −0.07 | +16.5 | 3.8 | 0.73 |
| 6 | do | DODP (2.0%) | −0.01 | Nil | −7.4 | Nil | −0.03 | +14.0 | 2.0 | 0.17 |
| 7 | do | DODP (3.0%) | −0.01 | −10.9 | −8.2 | −0.01 | −0.03 | +23.5 | 5.6 | 0.60 |
| 8 | DOPT (1.5%) | DODP (0.5%) | −0.02 | −0.01 | −0.2 | Nil | +0.03 | +4.9 | 1.57 | Negligible |

TABLE II.—OXIDATION/CORROSION TESTS AT 347° F. (72 HOURS). DI(2-ETHYL HEXYL) SEBACATE USED THROUGHOUT AS BASE FLUID

| Test No. | Additives present | | Weight change of metal specimens, mgs./sq. cm. | | | | | Percent change in viscosity, cs. at 100° F. | Total acid number increase, mg. KOH/gm. | Percent insoluble in pet. ether |
|---|---|---|---|---|---|---|---|---|---|---|
| | (a) | (b) | Aluminium alloy | Magnesium alloy | Copper | Steel | Silver | | | |
| 9 | DOPT (1.0%) | DODP (1.0%) | −0.02 | −0.03 | −3.3 | −0.02 | | +6.7 | 2.1 | Negligible |
| 10 | DOPT (1.0%) | DODP (0.5%) | +0.03 | +0.03 | −1.7 | +0.03 | Nil | +4.7 | 2.6 | Do. |
| 11 | DOPT (0.5%) | DODP (1.5%) | Nil | Nil | −3.1 | −0.02 | −0.05 | +6.7 | +1.57 | Do. |
| 12 | None | PAN (2.0%) | Nil | Nil | −1.5 | Nil | Nil | +9.6 | 0.65 | 1.52 |
| 13 | do | PAN (1.0%) | +0.05 | +0.06 | Nil | +0.04 | +0.04 | +5.0 | 0.22 | 1.52 |
| 14 | do | PAN (0.5%) | +0.03 | +0.03 | −0.05 | Nil | +0.02 | +2.6 | 0.22 | 0.48 |
| 15 | DOPT (1.0%) | PAN (0.5%) | −0.02 | −0.02 | −0.20 | −0.02 | −0.20 | +3.2 | 1.01 | Negligible |
| 16 | DOPT (1.5%) | PAN (0.5%) | −0.01 | −0.03 | −0.30 | −0.01 | −0.01 | +5.8 | 0.51 | Do. |

TABLE III.—OXIDATION/CORROSION TESTS AT 347° F. (72 HOURS). BASE FLUID—DI(2-ETHYL HEXYL) SEBACATE+0.1% BENZOTRIAZOLE

| Test No. | Additives present | | Weight change of metal specimens, mgs./sq. cm. | | | | | Percent change in viscosity, cs. at 100° F. | Total acid number increase, mg. KOH/gm. | Percent insoluble in pet. ether |
|---|---|---|---|---|---|---|---|---|---|---|
| | (a) | (b) | Aluminium alloy | Magnesium alloy | Copper | Steel | Silver | | | |
| 17 | DOPT (2.0%) | None | −0.04 | −0.03 | −0.6 | −0.04 | −0.17 | +5.4 | 2.5 | 0.10 |
| 18 | DOPT (1.5%) | do | +0.01 | +0.01 | −2.3 | +0.10 | −0.10 | +5.3 | 2.3 | 0.10 |
| 19 | None | DODP (2.0%) | −0.02 | −0.01 | −0.10 | −0.03 | −0.04 | +6.9 | 3.0 | 0.10 |
| 20 | DOPT (0.75%) | DODP (0.75%) | Nil | +0.01 | Nil | +0.01 | +0.01 | +3.0 | 0.26 | 0.10 |
| 21 | DOPT (1.0%) | DODP (1.0%) | Nil | Nil | −0.02 | Nil | −0.01 | +4.0 | 0.92 | Negligible |
| 22 | None | PAN (2.0%) | Nil | Nil | Nil | Nil | Nil | +6.3 | 0.19 | 0.58 |
| 23 | do | PAN (0.5%) | +0.03 | +0.06 | +0.04 | +0.06 | +0.10 | +2.5 | Nil | 0.18 |
| 24 | DOPT (1.0%) | PAN (0.5%) | Nil | Nil | −0.01 | Nil | +0.02 | +4.2 | 0.31 | 0.10 |
| 25 | DOPT (1.0%) | PAN (1.0%) | +0.02 | +0.01 | +0.02 | +0.02 | +0.02 | +5.3 | 0.31 | 0.20 |
| 26 | DOPT (1.0%) | PBN (0.5%) | Nil | +0.01 | −0.02 | +0.01 | −0.02 | +4.1 | 0.32 | 0.10 |
| 27 | DOPT (1.0%) | DP (0.5%) | −0.01 | −0.01 | Nil | Nil | Nil | +4.6 | 0.41 | 0.10 |

TABLE IV.—OXIDATION/CORROSION TESTS AT 347° F. (72 HOURS). BASE FLUID—DI(2-ETHYL HEXYL) SEBACATE+0.05% BENZOTRIAZOLE

| Test No. | Additives present | | Weight change of metal specimens, mgs./sq. cm. | | | | | Percent change in viscosity, cs. at 100° F. | Total acid number increase, mg. KOH/gm. | Percent insoluble in pet. ether |
|---|---|---|---|---|---|---|---|---|---|---|
| | (a) | (b) | Aluminium alloy | Magnesium alloy | Copper | Steel | Silver | | | |
| 28 | HDPT (2.0%) | None | +0.01 | +0.01 | −0.36 | −0.03 | +0.10 | +4.7 | 0.83 | Negligible |
| 29 | HDPT (1.0%) | PBN (0.5%) | Nil | Nil | +0.01 | Nil | +0.10 | +3.0 | 0.10 | 0.18 |

TABLE V.—OXIDATION/CORROSION TESTS AT 347° F. (72 HOURS). VARIOUS BASE FLUIDS

| Test No. | Base fluid | Additives present | | Weight change of metal specimens, mgs./sq. cm. | | | | | Percent change in viscosity, cs. at 100° F. | Total acid number increase, mg. KOH/gm. | Percent insoluble in pet. ether |
|---|---|---|---|---|---|---|---|---|---|---|---|
| | | (a) | (b) | Aluminium alloy | Magnesium alloy | Copper | Steel | Silver | | | |
| 30 | DOAZ | Phenothiazine (0.5%) | None | +0.10 | −0.05 | −0.30 | +0.06 | +0.10 | +2.9 | 0.69 | 0.53 |
| 31 | DOAZ | DBPT (1.0%) | None | Nil | Nil | −2.30 | Nil | −0.10 | +5.6 | 2.6 | 0.53 |
| 32 | DOAZ | DBPT (0.5%) | DODP (0.5%) | Nil | +0.02 | −3.40 | Nil | −0.05 | +7.4 | 0.09 | Negligible |
| 33 | DODA | HDPT (2.0%) | None | Nil | Nil | −10.1 | Nil | Nil | +8.4 | 2.02 | Negligible |
| 34 | DODA | None | OPAN (1.0%) | Nil | −42.0 | −8.0 | Nil | Nil | +35.7 | 11.0 | 10.0 |
| 35 | DODA | HDPT (1.0%) | OPAN (0.5%) | Nil | Nil | −0.35 | Nil | Nil | +6.7 | 1.13 | Negligible |

TABLE VI.—COMPOSITIONS OF COMPOSITE BLENDS

| Composition No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Percent by wt. of: | | | | | | | | | | | | | | | |
| Di(2-ethyl hexyl) sebacate | | | | | | 68.2 | 68.5 | 66.65 | 66.65 | 65.65 | 66.65 | 66.25 | 94.25 | | |
| Di-iso octyl azelate | 33.325 | 33.325 | 33.825 | 33.325 | 33.85 | | | | | | | | | 94.25 | 23.91 |
| Di-propylene glycol dipelargonate | 33.325 | 33.325 | 33.825 | 33.325 | 33.85 | | | | | | | | | | |
| Di-(iso-octyl/iso-decyl) adipate | | | | | | | | | | | | | | | 23.91 |
| "Mixed diester" blend | | | | | | | | | | | | | | | 47.83 |
| "Ucon" L.B. 1145 | 28.0 | 28.0 | 28.0 | 28.0 | 29.0 | 28.9 | 27.05 | 28.0 | 28.0 | 28.0 | 28.0 | 28.0 | | | |
| Phenothiazine | | | | | 1.0 | 1.0 | | | | | | | | | |
| 3,7 dioctyl phenothiazine | 3.0 | | 1.5 | 2.0 | | | 2.5 | 3.0 | 2.0 | 2.0 | 1.5 | 1.5 | 1.5 | 1.5 | 0.8 |
| pp' Dioctyl diphenylamine | | | | 1.0 | | | | | 1.0 | 2.0 | 1.5 | 1.5 | 1.5 | 1.5 | 0.8 |
| Diphenylamine | | 3.0 | 0.5 | | | | | | | | | | | | |
| "Aroclor" 4465 | 2.0 | 2.0 | 2.0 | 2.0 | 2.0 | 1.6 | 1.6 | 2.0 | 2.0 | 2.0 | 2.0 | | | | |
| "Aroclor" 1254 | | | | | | | | | | | | 2.4 | 2.4 | 2.4 | 2.4 |
| "CPS" conc | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| Benzotriazole | 0.1 | 0.1 | 0.1 | 0.1 | 0.05 | 0.05 | 0.1 | 0.1 | 0.1 | 0.1 | 0.1 | 0.1 | 0.1 | 0.1 | 0.1 |

The "Mixed Diester" blend is a commercially available material consisting of a mixture of approximately 43% diisooctyl adipate, 48% diisooctyl blutarate and 9% diisooctyl succinate.

TABLE VII OXIDATION/CORROSION TESTS AT 347° F. (72 HOURS). MISCELLANEOUS COMPOSITE BLENDS

| Test No. | Composition | Antioxidant additives present | | Weight change of metal specimens, mgs./sq. cm. | | | | | Percent change in visc., cs. at 100° F. | Total acid number increase, mg. KOH/gm. | Percent insoluble in pet. ether |
|---|---|---|---|---|---|---|---|---|---|---|---|
| | | (a) | (b) | Aluminum alloy | Magnesium alloy | Copper | Steel | Silver | | | |
| 36 | No. 1 | DOPT (3.0%) | None | Nil | Nil | −1.10 | +0.02 | −0.05 | −7.3 | 1.01 | Negligible |
| 37 | No. 2 | None | DP (3.0%) | Nil | Nil | Nil | Nil | Nil | −10.6 | 1.01 | 0.98 |
| 38 | No. 3 | DOPT (1.5%) | DP (0.5%) | Nil | Nil | −0.06 | Nil | −0.03 | −3.1 | 1.01 | 0.10 |
| 39 | No. 4 | DOPT (2.0%) | DODP (1.0%) | −0.01 | Nil | −0.22 | +0.01 | −0.01 | −3.0 | 1.68 | 0.11 |
| 40 | No. 5 | Phenothiazine (1.0%) | | +0.09 | +0.12 | +0.18 | +0.10 | +0.12 | −15.1 | 4.0 | 1.15 |
| 41 | No. 6 | do | | +0.11 | +0.16 | +0.16 | +0.10 | +0.11 | −2.2 | 1.04 | 1.0 |
| 42 | No. 7 | DOPT (2.5%) | None | −0.01 | −0.04 | −0.30 | −0.04 | −0.16 | −3.9 | 1.51 | Negligible |
| 43 | No. 9 | DOPT (2.0) | DODP (1.0) | Nil | −0.02 | −0.15 | Nil | −0.05 | +0.4 | 1.01 | Do. |
| 44 | No. 11 | DOPT (1.5%) | DODP (1.5%) | −0.02 | Nil | −0.03 | −0.01 | −0.02 | +0.4 | 0.95 | Do. |
| 45 | No. 12 | DOPT (1.5%) | DODP (1.5%) | Nil | −0.02 | −0.04 | −0.02 | −0.03 | +1.1 | 0.53 | Do. |
| 46 | No. 13 | DOPT (1.5%) | DODP (1.5%) | −0.03 | −0.04 | −0.08 | −0.01 | −0.08 | +6.1 | 0.83 | Do. |
| 47 | No. 14 | DOPT (1.5%) | DODP (1.5%) | −0.04 | −0.01 | −0.14 | −0.03 | −0.05 | +7.7 | 1.35 | Do. |
| 48 | No. 15 | DOPT (0.8%) | DODP (0.8%) | −0.01 | +0.01 | −0.05 | Nil | −0.02 | +4.6 | 0.80 | Do. |

TABLE VIII.—AIR BLOWING OXIDATION AND CONFINED HEAT STABILITY TESTS

| Test No. | Composition | Antioxidant additives present | | Air blowing oxidation test, 192 hours at 150° C. | | | | Confined heat stability test (192 hours at 250° C.) | | | |
|---|---|---|---|---|---|---|---|---|---|---|---|
| | | (a) | (b) | Volatility loss, percent | Viscosity increase, percent | Acidity increase, mg. KOH/gm. | Benzene insolubles, mg./gm. | Volatility loss, percent | Viscosity increase, percent | Acidity increase, mg. KOH/gm. | Benzene insolubles, mg./gm. |
| 49 | No. 7 | DOPT (2.5%) | None | 5.1 | 12 | 2.0 | 0.05 | 20 | 50 | 13 | 0.25 |
| 50 | No. 8 | DOPT (3.0%) | do | 7.5 | 18 | 2.1 | 0.10 | 25 | 100 | 15 | 0.50 |
| 51 | No. 9 | DOPT (2.0%) | DODP (1.0%) | 4.2 | 7 | 1.2 | 0.05 | 15 | 25 | 10 | 0.40 |
| 52 | No. 10 | DOPT (2.0%) | DODP (2.0%) | 3.8 | 7 | 1.2 | 0.06 | 13 | Nil | 7 | 0.25 |
| 53 | No. 11 | DOPT (1.5%) | DODP (1.5%) | 3.8 | 6 | 1.0 | 0.09 | 12 | Nil | 6 | 0.30 |
| 54 | 70%DOS, 30% Ucon LB 1145 | None | None | 52 | 26 | 76 | Negligible | | | | |

TABLE IX

| Composition No. | 16 | 17 | 18 | 19 |
|---|---|---|---|---|
| Trimethylol propane esters of mixed straight chain aliphatic carboxylic acids (25% C₆-C₈) (75%, C₉ approx.) | 61 | 61 | 61 | 62.2 |
| Diisooctyl azelate | 18 | 18 | 18 | 18 |
| UCON LB 1715 | 16.44 | 16.44 | 16.44 | 16.44 |
| DOPT | 1.1 | 2.2 | | |
| Phenothiazine | | | | 1.0 |
| DODP | 1.1 | | 2.2 | |
| Aroclor 5460 | 2.0 | 2.0 | 2.0 | 2.0 |
| Sebacic Acid | 0.01 | 0.01 | 0.01 | 0.01 |
| CPS concentrate | 0.25 | 0.25 | 0.25 | 0.25 |
| Benzotriazole | 0.1 | 0.1 | 0.1 | 0.1 |

TABLE X.—OXIDATION/CORROSION TESTS (72 HOURS)

| Test No. | Temp., °F. | Comp. | Weight change of metal specimens, mgs./sq. cm. | | | | | Percent change in viscosity | Acid number change | Percent insoluble in pet. ether |
|---|---|---|---|---|---|---|---|---|---|---|
| | | | Aluminium alloy | Magnesium alloy | Copper | Steel | Silver | | | |
| 58 | 347 | 16 | +0.01 | Nil | −0.06 | Nil | −0.01 | +2.9 | +0.75 | 0.10 |
| 59 | 347 | 17 | Nil | −0.01 | −0.25 | −0.01 | −0.06 | −2.67 | +1.89 | 0.06 |
| 60 | 347 | 18 | −0.02 | −0.02 | −0.25 | −0.01 | −0.14 | −2.0 | +1.53 | 0.04 |
| 61 | 347 | 19 | −0.01 | Nil | −0.01 | −0.01 | −0.03 | +5.06 | +1.32 | 1.4 |
| 62 | 400 | 16 | Nil | −17.1 | −0.2 | Nil | −0.01 | +9.9 | +9.21 | Not tested |
| 63 | 400 | 17 | −0.14 | −72.0 | −1.1 | Nil | −0.2 | (¹) | +12.6 | Do. |
| 64 | 400 | 18 | +0.02 | −26.2 | −0.76 | +0.04 | +0.1 | (²) | +12.6 | Do. |

¹ Heterogeneous after test.   ² Thixotropic after test.

The lubricating composition of, for example, Test 45 is a lubricant which is particularly suitable for use in internal combustion engines or other mechanisms where high temperatures are involved, e.g. in the lubrication of gas turbines, especially the propeller turbine type where the lubricant is required to lubricate not only the bearings but also the reduction gearing; this lubricating composition is also stable and fluid at low temperatures, e.g. −70° F.

The specification limits for the MIL–L–7808 oxidation corrosion test described in column 8 lines 52–65 are as follows:

Weight change of copper specimen ±0.4 mg./sq. cm. max.

Weight change of all other specimens ±0.2 mg./sq. cm. max.

Viscosity at 100° F., percent change −5 to +15

Acidity (total acid number) increase 2.0 max.

There is no requirement for the insolubles in petroleum ether to be determined but we have found that this criterion gives a useful indication of the sludging propensities of an oil. An oil with an insolubles content of 0.2% or less would be considered satisfactory.

It will be seen from Tables I, II and V that no composition containing only one additive, whether of class (a) or (b), was entirely satisfactory (see Tests 2 to 7, 12 to 14, 31, 33, 34). The advantage of using a combination of additives of types (a) and (b) can clearly be seen from tests 8 to 11, 15 to 16, 32 and 35, but of these only tests 8, 15, 16 and 35 were entirely within the limits of the above-mentioned specification.

The additional advantage obtained by adding benzotriazole (additive (c)) can readily be appreciated by comparing the results in Tables I and II with those in Table III. The results given by all compositions in this table and in Table IV containing the three additives (a) (b) and (c) were excellent (see Tests 20, 21, 24 to 27 and 29). Pairs of tests on blends with and without benzotriazole, which are directly comparable are (9 and 21) and (15 and 24), from which it will be seen that the presence of benzotriazole not only substantially reduced the loss in weight of the copper specimen but also acted synergistically with the other additives in retarding the general oxidation of the oils as measured by their increase in acidity.

Benzotriazole itself had no antioxidant properties and when a blend containing 0.2% by weight of this additive in di(2-ethyl hexyl) sebacate was subjected to the MIL–L–7808 oxidation/corrosion test, a viscosity increase of 471% and an acidity increase of 23 mg. KOH/gm. were obtained. The petroleum ether insolubles were very high and the magnesium specimen had lost 41.6 mgs./sq. cm.

Table VII summarizes the results of tests on a number of different blends all containing benzotriazole (see Table VI). In all cases where the three additives (a) (b) and (c) were present, satisfactory results were obtained (tests 38, 39, 42 to 48). Of the other tests (36, 37, 40 to 42) only 42 was satisfactory but the copper loss, viscosity decrease and acidity rise were all larger than normal in this test.

Table X summarizes the results of tests on blends containing a major proportion of a hindered ester (see Table IX). These blends possessed intrinsically better oxidation stability than blends based on di(2-ethyl hexyl) sebacate or other diesters and tests 58 to 61 were all satisfactory except for 61 in which the presence if phenothiazine gave rise to high insolubles. The results given by composition 16 (Test 58) in which all three additives (a) (b) and (c) were present were, however, manifestly better than those given by the two blends (Tests 59 and 60) containing only two of these additives. This superiority of composition 16 was further emphasized by raising the temperature of the test to 400° F. (Tests 62 to 64).

Table VIII further illustrates the advantage of blends containing the three additives (a) (b) and (c) (Tests 51 to 53) over blends containing only two (Tests 49 and 50) in two different types of oxidation test. All these blends contained benzotriazole.

We claim:

1. A lubricating composition consisting essentially of a synthetic organic lubricating oil, which oil consists essentially of a neutral saturated organic carboxylic acid ester base, said lubricating oil having dissolved therein three additives (a), (b) and (c).

additive (a) being present in an amount to provide a sulphur content of from 0.03 to 0.20 percent by weight on the total weight of the composition and being a phenothiazine derivative having the formula

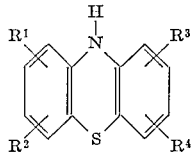

wherein the benzene, rings of the derivative may contain at least one additional benzene ring fused thereto and wherein $R^1$, $R^2$, $R^3$ and $R^4$ are selected from the group consisting of hydrogen, alkyl radicals and alkoxy radicals ($C_nH_{2n+1}O$), the derivative having a total number of carbon atoms in radicals $R^1$, $R^2$, $R^3$ and $R^4$ of from 8 to 20.

additive (b) being present in an amount to provide a nitrogen content of from 0.015 to 0.10 percent by weight on the total weight of the composition and being a secondary aromatic amine, containing two aromatic groups directly attached to nitrogen, selected from the group consisting of diphenylamines and N-phenylnaphthylamines, and additive (c) being present in an amount of from 0.01 to 0.3 percent by weight on the weight of the composition and being benzotriazole.

2. A lubricating composition as claimed in claim 1 wherein the synthetic lubricating oil has a viscosity index of at least 100, a pour point not exceeding —40° F., a boiling point of not less than 600° F. and a flash point of not less than 350° F.

3. A composition as claimed in claim 1 wherein additive (a) is a dialkyl phenothiazine having from 8 to 20 carbon atoms in the alkyl groups.

4. A composition as claimed in claim 1 wherein additive (a) is 3,7-dioctyl phenothiazine.

5. A composition as claimed in claim 1 wherein additive (a) is a monoalkoxy phenothiazine having from 8 to 20 carbon atoms in the alkoxy group.

6. A composition as claimed in claim 1 wherein additive (b) is selected from the group consisting of diphenylamines and N-phenylnaphthylamines, said additive being alkyl substituted in at least one aromatic nucleus and containing up to 20 carbon atoms in the alkyl substituent.

7. A composition as claimed in claim 1 wherein additive (b) is selected from the group of amines consisting of pp'-dioctyl diphenylamine and phenyl-α-naphthylamine.

8. A composition as claimed in claim 1 wherein additive (c) is present in an amount of from 0.05 to 0.20 percent by weight on the total weight of the composition.

9. A composition as claimed in claim 1 wherein the synthetic organic lubricating oil has the general formula:

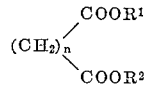

where $R^1$ and $R^2$ are branched chain alkyl radicals having from 6 to 9 carbon atoms, each, and $n$ is from 7 to 8.

10. A composition as claimed in claim 9 wherein the diester is selected from the group consisting of di(2-ethyl hexyl) azelate, di(2-ethyl hexyl) sebacate, di-isooctyl sebacate, 2-ethyl hexyl 3:5:5 trimethyl hexyl sebacate and di-isooctyl azelate.

11. A composition as claimed in claim 1 wherein the synthetic organic lubricating oil contains from 1 to 70 percent by weight of a complex ester having the general formula $R^2OOC.R.COOR^3OOC.R.COOR^1$ wherein R is selected from the group consisting of saturated aliphatic and alicylic hydrocarbon radicals having 2 to 8 carbon atoms, $R^1$ and $R^2$ are selected from the group consisting of branched-chain alkyl and alkyl-substituted cycloalkyl radicals having from 6 to 9 carbon atoms and $R^3$ is selected from the group consisting of alkylene and oxyalkylene radicals having from 2 to 12 carbon atoms.

12. A composition as claimed in claim 1 wherein the synthetic organic lubricating oil comprises at least one neutral ester of a hindered polyhydric alcohol possessing the neopentyl structure and not more than 8 carbon atoms, with a carboxylic acid having from 6 to 9 carbon atoms.

13. A composition as claimed in claim 12 wherein the ester is selected from the group consisting of trimethylolpropane tri-n-hexanoate, trimethylolpropane tri-n-heptanoate, trimethylolpropane tri-n-octanoate and trimethylolpropane tripelargonate.

14. A composition as claimed in claim 1 wherein the synthetic organic lubricating oil contains from 1 to 50 percent by weight of a substantially water insoluble polyoxyalkylene glycol ether having a viscosity of from 10 to 70 centistokes at 210° F.

15. A composition as claimed in claim 1 wherein there is included a load-carrying additive selected from the group consisting of chlorinated diphenyls and chlorinated polyphenyls, said additive containing at least two chlorine atoms for each benzene nucleus present and said chlorine atoms being attached directly to carbon atoms of the aromatic nuclei.

16. A lubricating composition consisting essentially of a diester which has the general formula:

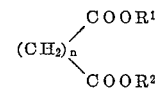

where $R^1$ and $R^2$ are selected from the group consisting of like and unlike radicals and are branched-chain alkyl radicals having 6 to 9 carbon atoms, and $n$ is from 7 to 8 having dissolved therein from 1 to 2 percent by weight of 3,7 dioctylphenothiazine, from 1 to 2 percent by weight of pp' dioctyldiphenylamine, from 0.8 to 3 percent by weight of a chlorinated diphenyl containing from 48 to 70 percent by weight of chlorine, and from 0.05 to 0.2 percent by weight of benzotriazole.

17. A composition as claimed in claim 16 wherein the diester is selected from the group consisting of di(2-ethyl hexyl) sebacate and di-iso-octyl azelate.

18. A lubricating composition as claimed in claim 16 wherein a part of the diester is replaced by from 25 to 30 percent by weight of a polyoxypropylene glycol ether having a viscosity of from 35 to 40 centistokes at 210° F.

19. A lubricating composition consisting essentially of substantially equal amounts of di-iso-octyl azelate and dipropylene glycol dipelargonate having dissolved therein from 1 to 2 percent by weight of 3,7 dioctylphenothiazine, from 1 to 2 percent by weight of pp' dioctyldiphenylamine, from 0.8 to 3 percent by weight of a chlorinated diphenyl containing from 48 to 70 percent of chlorine, and from 0.05 to 0.2 percent by weight of benzotriazole.

20. A lubricating composition consisting essentially of from 48 to 67% by weight of a hindered ester which has the general formula

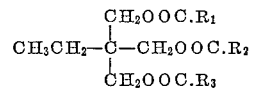

wherein $R_1$, $R_2$ and $R_3$ are straight chain alkyl radicals having from 6 to 9 carbon atoms, from 15 to 25% by weight of a diester as defined in claim 16, from 15 to 20% by weight of a polyoxypropylene glycol ether having a viscosity of from 35 to 40 centistokes at 210° F., from 1 to 2 percent by weight of 3,7 dioctyl phenothiazine, from 1 to 2 percent by weight of pp' dioctyl diphenylamine, from 0.8 to 3 percent by weight of a chlorinated polyphenyl containing from 48 to 70 percent by weight of chlorine and from 0.05 to 0.2 percent by weight of benzotriazole.

References Cited by the Examiner

UNITED STATES PATENTS

| | | | |
|---|---|---|---|
| 2,781,318 | 2/1957 | Cyphers | 252—47 |
| 2,815,327 | 12/1957 | Mehr et al. | 252—47.5 |
| 2,870,195 | 1/1959 | Heininger et al. | 252—56 |
| 2,930,758 | 3/1960 | Tierney et al. | 252—47.5 X |
| 2,941,953 | 6/1960 | Hatch | 252—389 |
| 2,971,912 | 2/1961 | Elliott et al. | 252—47.5 X |
| 3,049,493 | 8/1962 | Young et al. | 252—56 |

FOREIGN PATENTS 794,115   4/1958   Great Britain.

DANIEL E. WYMAN, *Primary Examiner.*